Patented Nov. 27, 1951

2,576,148

UNITED STATES PATENT OFFICE 2,576,148

ADHESIVE TAPE

Martin L. Schechtman, New Market, N. J., assignor to Industrial Tape Corporation, a corporation of New Jersey No Drawing. Application January 12, 1950,
Serial No. 138,257

9 Claims. (Cl. 117—122)

1

This invention relates to adhesive coated flexible tapes and sheets and more particularly to metal tapes and sheets that are coated with normally tacky and pressure-sensitive adhesives. This application is a continuation in part of application Ser. No. 30,189, filed May 29, 1948, now abandoned.

Normally tacky and pressure-sensitive adhesive sheets and tapes (hereinafter referred to collectively as tapes) based on fibrous or non-metallic film materials are widely known and have received considerable commercial development in this and other countries. Metal backed tapes of similar construction were considered in the literature at various times and there were attempts to produce them commercially, but in the past development of such products on a commercial scale has not progressed very far. The main cause of this retardation of the development of normally tacky and pressure-sensitive metal tapes was the difficulty of anchoring the normally tacky and pressure-sensitive adhesive to those metals that offered the greatest promise and were most desired as backings, namely, lead, aluminum, and zinc-coated aluminum. Prolonged storage or repeated use of metal tape samples of the prior art resulted frequently in separation of the adhesive from the backing resulting in a useless product or in one that could be used only with difficulty. In addition, the normally available hard grades of the metals formed sharp edges that tended to cut the skin of the users presenting grave danger of accidents. Recently, softer grades of the metals became available, which, however, continued to present anchoring difficulties.

Even though there were these objections to earlier tacky and pressure-sensitive metal products, the need for such products was great and demand, though unsatisfied, continued. As normally tacky and pressure-sensitive adhesive products based on non-metallic backings developed it became more and more obvious that for any given thickness of a tape product the strongest possible tape would have to be based upon a metal backing. In view of the crowded spaces wherein adhesive tapes are frequently applied, for instance, in splicing cables, minimum thickness coupled with strength is of course of primary importance. Moreover, as to durability and permeability most adhesive tape backings of the prior art permitted some degree of moisture penetration and deteriorated under adverse climatic conditions with age. Here again only metallic backings provide a product satisfactory under the greatest variety of severe conditions. With increased utilization of high frequency currents the problem of providing satisfactory metal tapes, which provide efficient insulation for such currents, became even more important than previously.

2

Broadly stated, the object of the present invention is to provide products wherein there is a firm, non-weakening bond between a metal backing and an adhesive coating. More particularly the object is to prepare normally tacky and pressure-sensitive metal-backed adhesive tapes wherein there is such a bond. Another object is to provide compositions adapted to bond adhesive compounds to metals. A further object is the provision of normally tacky and pressure-sensitive adhesive tapes that are free of the objections against similar products of the prior art. Yet another object is the provision of a satisfactory normally tacky and pressure-sensitive adhesive tape that conforms readily to surfaces to which it is applied, that is thin, and that has high strength and low moisture-permeability. Other objects will be apparent as the invention is more fully described hereinafter.

In accordance with the invention a normally tacky and pressure-sensitive adhesive tape is prepared by coating a flexible metal sheet with a thin layer of a composition of vinyl chloride acetate copolymer, acrylic-butadiene copolymer composed mainly (at least to the extent of fifty per cent by weight) of butadiene, and a minor amount of maleic anhydride, reacted preferably with one of the aforementioned copolymers. This primer layer is coated with another primer layer composed of acrylic-butadiene copolymer as described above and comprising an elastomer that is compatible with the elastomeric base of the normally tacky and pressure-sensitive adhesive composition used. The normally tacky and pressure-sensitive adhesive may be applied directly to the surface of this second primer layer. A satisfactory normally tacky and pressure-sensitive adhesive product results wherein the adhesive is secured firmly to its backing and wherein there is no separation of the two layers even after long storage or during repeated use under adverse conditions.

While various grades of metal foil may be used in the production of normally tacky and pressure-sensitive adhesive tapes, for safety reasons the softest available grades which do not have sharp cutting edges appear most suitable. Where, as in the case of aluminum, this soft grade is so weak as to make coating and handling difficult, half-hard and particularly quarter-hard grades will be preferred. The term half-hard means that the tensile strength of the metal is close to half-way between the hardest and the softest commercial foil. Quarter-hard foil in turn has a tensile strength approximately half-way between the softest commercial foil and half-hard foil. Half-hard and quarter-hard grades of inert backing metals such as lead, aluminum, zinc, zinc coated aluminum and tin are highly suitable for purposes of the invention.

In preferred embodiments of the invention each of the primer layers comprises a weight of 0.1–0.5 ounce per square yard and the normally tacky and pressure-sensitive adhesive is applied to a spreading weight of 0.75–4 ounces per square yard. While application of the layers by means of heat, using, for instance, a calender or a hot metal coater is possible, the usual method of application comprises spreading from solvent at or above normal room temperatures and drying the coat at elevated temperatures, for instance, for one to three minutes at 150–300° F.

In order to disclose the nature of the invention more clearly, preferred embodiments thereof will be described now in considerable detail. It should be understood, however, that this is done by way of example only, and solely for the purpose of illustrating by means of specific examples, the basic principles which are applicable broadly to all embodiments contemplated in the invention, i. e., the invention is not restricted to the specific examples described hereinafter.

Example I

Quarter-hard aluminum foil having a thickness of one mil was coated to a coating weight of one-quarter of an ounce per square yard with the following first primer coating:

| | Parts by weight |
|---|---|
| Copolymer of 86% by weight vinyl chloride, 13% vinyl acetate and 1% maleic anhydride having a molecular weight of 16,000 (Staudinger viscosity method) | 10 |
| Copolymer of 75% by weight butadiene and 25% by weight acrylonitrile having a Mooney viscosity of 50 measured under standard conditions | 1 |

The above composition was dispersed in methyl ethyl ketone to a concentration of 20% by weight before application.

After drying of the coated product for 2½ minutes at 260° F., 0.3 ounce per square yard of a second primer was applied which was composed of:

| | Part by weight |
|---|---|
| Copolymer of 75 per cent by weight butadiene and 25 per cent by weight of acrylonitrile as above | 1 |
| Copolymer of 75 per cent by weight butadiene and 25 per cent styrene having a Mooney viscosity of 90 to 110 | 1 |

(This had been dispersed to a concentration of 20 per cent in a solvent composed of half methyl ethyl ketone, half aromatic aliphatic or aromatic petroleum solvent such as toluol.)

This coating was dried in the same manner as the first coating and a normally tacky and pressure-sensitive adhesive composition based on natural rubber was applied by a reverse roll coater from solvent to a coating weight of 1.5 ounces per square yard. This adhesive composition was composed of the following parts by weight:

| | Parts |
|---|---|
| Grizzly pale crepe rubber | 6 |
| Zinc oxide | 5 |
| Polyterpene (melting point 115° C.) | 2½ |
| Polyterpene (melting point 70° C.) | 2½ |
| Wool fat | ½ |
| Diamyl hydroquinone antioxidant | 0.1 |

After drying of the adhesive coating a metal backed normally tacky and pressure-sensitive tape resulted that had a firm and permanent bond between adhesive and metallic backing and that withstood repeated abuse of the product and storage at high temperatures and humidities. In its applications the product provided a strong and efficient moisture and vapor barrier protecting the weakened cable joints that were spliced by means of the tape.

Example II

Soft lead foil having a thickness of three mils was coated to a coating weight of 0.4 ounce per square yard with the following first primer coating:

| | Parts by weight |
|---|---|
| Copolymer of 86% per cent by weight vinyl chloride, 13 per cent vinyl acetate and 1 per cent maleic anhydride having a molecular weight of 55,000 (asmotic method) | 8 |
| Copolymer of 60 per cent by weight butadiene and 40 per cent by weight acrylonitrile having a Mooney viscosity of 45 measured under standard conditions | 1 |

The above composition was applied after dispersion in acetone to a concentration of 20 per cent by weight.

After drying of the coated product for three minutes at 300° F. 0.25 ounce per square yard of a second primer was applied that was composed of:

| | Parts by weight |
|---|---|
| Copolymer of 60 per cent by weight butadiene and 40 per cent by weight acrylonitrile as above | 1½ |
| Copolymer of 50 per cent by weight butadiene and 50 per cent by weight styrene having a Mooney viscosity of 50 | 1 |

(This had been dispersed to a concentration of 20 per cent in a solvent composed of one-half toluene and one-half aliphatic ketones.)

This coating was dried in the same manner as the first coating and a normaly tacky and pressure-sensitive adhesive composition based on butadiene styrene rubber was applied in the same manner as the adhesive composition of the first example but to a coating weight of 2 ounces per square yard. The composition was composed of the following parts by weight:

| | Parts |
|---|---|
| Copolymer of 50 per cent butadiene and 50 per cent styrene having a Mooney voscosity of 55 | 20 |
| Glycerol ester of hydrogenated rosin | 15 |
| Tertiary amyl phenol formaldehyde | 2 |
| Diamyl hydroquinone | ½ |

After drying of the adhesive coating a thoroughly satisfactory normally tacky and pressure-sensitive metal tape resulted.

Example III

Soft aluminum foil having a thickness of two mils was coated to a coating weight of 0.15 ounce per square yard with the following first primer coating:

| | Parts by weight |
|---|---|
| Copolymer of 86 per cent by weight vinyl chloride, 13 per cent vinyl acetate and one per cent maleic anhydride as above | 2 |
| Copolymer of 75 per cent butadiene and 25 percent acrylonitrile as in Example I | 1 |

(This formula had been dispersed to a concentration of 15 per cent solids by weight in methyl ethyl ketone solvent.)

The coating was dried for three minutes at 280° F. and thereafter 0.25 ounces per square yard of a second primer was applied. This second primer was composed of:

| | Parts by weight |
|---|---|
| Copolymer of 60 per cent butadiene and 40 per cent acrylonitrile as above | 2 |
| Copolymer of 75 per cent butadiene and 25 per cent styrene as above | 1 |

(This formula had been dispersed in toluol to a concentration of 15 per cent before application.)

This coating was dried in the same manner as the first coating and a normally tacky and pressure-sensitive adhesive composition based on butadiene styrene rubber was applied in the same manner as the adhesive compositions of the preceding examples. The composition was composed of the following parts by weight:

| | Parts |
|---|---|
| Copolymer of 50 per cent butadiene and 50 per cent styrene having a Mooney viscosity of 90 | 2½ |
| Smoked sheet rubber | 3½ |
| Zinc oxide | 6 |
| Polyterpene (melting point 70° C.) | 2 |
| Polyterpene (melting point 115° C.) | 2 |
| Diamyl hydroquinone antioxidant | 0.1 |
| Petroleum oil plasticizer | 1½ |

The resulting product was satisfactory and passed all tests for vapor-permeability and anchorage of the adhesive coating.

*Example IV*

In this example the backing of Example I was coated with 0.25 ounce per square yard of a primer composed of:

| | Parts by weight |
|---|---|
| Copolymer of 89 per cent by weight vinyl chloride and 11 per cent vinyl acetate having a molecular weight of 24,000 (Staudinger viscosity method) having a Mooney viscosity of 45 | 10 |
| Copolymer of 60 per cent by weight butadiene and 40 per cent by weight acrylonitrile masticated for ten minutes on a hot mill with 8 per cent by weight maleic anhydride | 1 |

(The above composition was dispersed in acetone to a concentration of 25 per cent by weight before application.)

After drying of the coated product for three minutes at 300° F. 0.25 ounce per square yard was applied of a second primer composed of:

| | Part by weight |
|---|---|
| Polyisobutylene having a molecular weight by the Staudinger method of 110,000 | 1 |
| Copolymer of 60 per cent by weight butadiene and 40 per cent by weight of acrylonitrile as above | 1 |

(The entire composition was dispersed in toluene to a concentration of 20 per cent solids before application.)

After drying of the coated product in the manner in which the first coating was dried, a normally tacky and pressure-sensitive adhesive based on polyisobutylene composition was applied. The adhesive was composed as follows:

| | Parts |
|---|---|
| Polyisobutylene (Staudinger viscosity 100–120) | 3 |
| Dehydrogened rosin gum | 1 |
| Alicyclic petroleum oil | 1 |

The resulting tape was as satisfactory as those of the earlier listed examples.

The following additional primer formulations may be substituted for the second primer in Example I:

*Example V*

| | Part by weight |
|---|---|
| Crude natural rubber | 1 |
| Copolymer of 75 per cent by weight butadiene and 25 per cent by weight acrylonitrile as above | 1 |

Dispersed in solvent and spread as in Example I.

*Example VI*

| | Part by weight |
|---|---|
| Balata rubber | 1 |
| Copolymer of 60 per cent by weight butadiene and 40 per cent by weight acrylonitrile as above | 1 |

Dispersed in solvent and spread as in Example I.

*Example VII*

| | Part by weight |
|---|---|
| Copolymer of 75 per cent by weight butadiene and 25 per cent by weight methacrylonitrile as above | 1 |
| Copolymer of 75 per cent by weight butadiene and 25 per cent styrene having a Mooney viscosity of 90–110 | 1 |

Dispersed and spread as in Example I.

*Example VIII*

| | Parts by weight |
|---|---|
| Copolymer of 60 per cent butadiene and 40 per cent by weight butyl acrylate or propyl methacrylate or other acrylic as defined herein, as above | 1½ |
| Copolymer of 75 per cent by weight butadiene and 25 per cent by weight styrene having a Mooney viscosity of 90–110 | 1 |

Dispersed and spread as in Example I.

All of the above compositions and variations thereof wherein polyisobutylene is substituted for the rubber, other than the butadiene-acrylic copolymer may be used to satisfaction.

In the execution of the invention inert metals other than those shown specifically in the examples may be used and the primer is useful in connection with all metals that may be made into tough foils. The first primer coating may preferably comprise vinyl chloride acetate copolymer to the extent of fifty per cent or more of the weight of the composition and butadiene copolymer to the extent of fifty per cent or less of the composition. One-quarter to five per cent maleic anhydride reacted with one of the polymers present is preferably used. The butadiene copolymer of the first primer is preferably a copolymer of acrylonitrile but may be a copolymer of any of the other acrylics, namely the lower acrylates and substituted acrylates such as, for instance, methyl acrylate, ethyl acrylate, propyl acrylate, butyl acrylate, pentyl acrylate and/or methyl methacrylate, ethyl methacrylate, propyl methacrylate, butyl methacrylate, pentyl methacrylate, hexyl methacrylate, etc. The vinyl chloride copolymer may comprise 65 to 95 per cent by weight of vinyl chloride and five to 30 per cent by weight of vinyl acetate. Its molecular weight may be from 30,000 to 100,000. The second primer may preferably comprise 35–85 per cent by weight of one of the butadiene copolymers listed immediately above and 15–65 per cent of elastomer that is highly compatible with the elastomeric base of the normally tacky and pressure-sensitive adhesive composition. In this connection "compatible" is intended to mean that the two polymers when mixed intimately, stored and subjected to moderate temperatures, say, at about 200° F. will not show visible signs of separation. Throughout the specification and the claims, the term polymer is intended to include copolymers and interpolymers and the term copolymers interpolymers of two or more materials.

The preparation or type of the adhesives forms no part of this invention and it has been noted that all normally tacky and pressure-sensitive adhesives when primed substantially in the manner of this invention provide satisfactory normally tacky and pressure-sensitive adhesive tapes. Normally tacky and pressure-sensitive adhesive compositions are those which need no activation by heat or solvent but which adhere by mere pressure, and such compositions are well known in the art and described in the patent and other literature.

Many other variations of the above described invention will be apparent to those skilled in the art and are included in the inventive concept.

I claim:

1. Adhesive tape comprising a metal foil backing, a normally tacky and pressure-sensitive rubbery adhesive coating thereon, a primer coating, adjacent to and in contact with said metal foil and comprising at least about fifty per cent by weight of a copolymer comprising from about sixty five to about ninety five per cent by weight of vinyl chloride, and from about five to about thirty per cent vinyl acetate, copolymerized with each other and having a molecular weight of from about thirty thousand to about one hundred thousand, said primer coating comprising up to about fifty per cent of copolymer of butadiene and at least one acrylic material selected from the group consisting of acrylonitrile, methyl acrylonitrile, methyl acrylate, ethyl acrylate, propyl acrylate, butyl acrylate, pentyl acrylate, methyl methacrylate, ethyl methacrylate, propyl methacrylate, butyl methacrylate, pentyl methacrylate and hexyl methacrylate, said copolymer being present in an amount not exceeding fifty per cent by weight of said primer coating, and comprising at least fifty per cent by weight of said second copolymer of butadiene, said primer also comprising from about one quarter of a per cent to about five per cent of its weight of maleic anhydride, and a second primer coating between and in contact with said first primer coating and said adhesive coating and comprising from about thirty-five to about eighty-five per cent by weight of a copolymer of at least fifty per cent of the copolymer weight of butadiene and also comprising at least one of said acrylic materials, said second primer coating also comprising from about fifteen to about sixty-five per cent by weight of an oil soluble elastomer that is highly compatible with the rubbery base of said normally tacky and pressure-sensitive adhesive compositions and that is selected from the group consisting of the copolymers of largely butadiene and of styrene, natural rubber, balata rubber, and polyisobutylene.

2. An adhesive tape according to claim 1 wherein said maleic anhydride is reacted with at least one of the polymers in said first primer coating.

3. An adhesive tape according to claim 1 wherein the acrylic material is acryonitrile.

4. An adhesive tape according to claim 1 wherein said metal foil is aluminum foil.

5. An adhesive tape according to claim 1 wherein each primer coating comprises a weight of from about one-tenth of an ounce per square yard to about one-half of an ounce per square yard and wherein the adhesive comprises from about three-quarters of an ounce to about four ounces per square yard.

6. An adhesive according to claim 1 wherein said oil soluble elastomer is polyisobutylene.

7. An adhesive according to claim 1 wherein said oil soluble copolymer is a copolymer of largely butadiene and of styrene.

8. Adhesive tape comprising an aluminum foil backing, a normally tacky and pressure-sensitive adhesive coating thereon, a primer coating adjacent to said foil and comprising substantially ten parts, by weight of a copolymer comprising essentially vinyl chloride and smaller amounts of vinyl acetate copolymerized with each other, and comprising a minor percentage of maleic anhydride reacted therewith, one part by weight of a copolymer of largely butadiene and of acrylonitrile, and a primer coating adjacent to said adhesive coating and comprising approximately equal parts by weight of a copolymer of largely butadiene and of acrylonitrile and of a copolymer of largely butadiene and of styrene that is highly compatible with the elastomeric base of the normally tacky and pressure-sensitive adhesive composition.

9. Adhesive tape comprising an aluminum foil backing, a normally tacky and pressure-sensitive adhesive coating thereon, a primer coating adjacent to said foil and comprising substantially ten parts by weight of a copolymer comprising essentially vinyl chloride and smaller amounts of vinyl acetate copolymerized with each other, and comprising a minor percentage of maleic anhydride reacted therewith, one part by weight of a copolymer of largely butadiene and of acrylonitrile, and a primer coating adjacent to said adhesive coating and comprising equal parts by weight of a copolymer of largely butadiene and of acrylonitrile and of a copolymer of largely butadiene and of styrene that is highly compatible with the elastomeric base of the normally tacky and pressure-sensitive adhesive composition; each of said primer coatings being applied in a weight of the order of one-quarter of an ounce per square yard and said adhesive coating being applied in a weight of the order of three quarters of an ounce to four ounces per square yard.

MARTIN L. SCHECHTMAN.

REFERENCES CITED

The following references are of record in the file of this patent:

UNITED STATES PATENTS

| Number | Name | Date |
|---|---|---|
| 2,106,133 | Goldman | Jan. 18, 1938 |
| 2,299,433 | Stoner | Oct. 20, 1942 |
| 2,330,353 | Henderson | Sept. 28, 1943 |

OTHER REFERENCES

"Vinylite Plastics" Bonding, by Carbide and Carbon Chemical Corp. (1944), pp. 10–12.